UNITED STATES PATENT OFFICE.

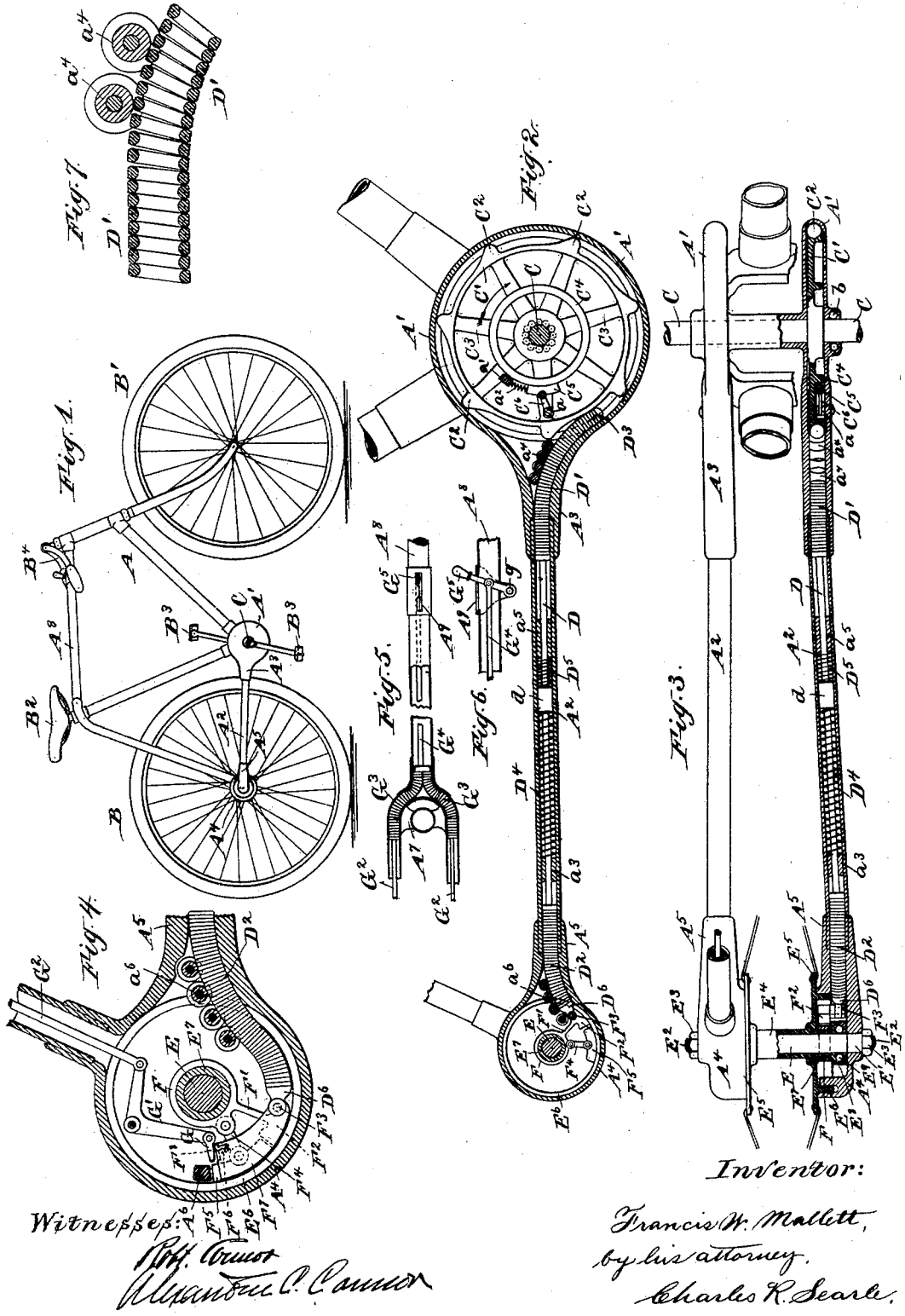

FRANCIS W. MALLETT, OF NEW YORK, N. Y., ASSIGNOR TO HIMSELF AND HULBERT BROTHERS & CO., OF SAME PLACE.

BICYCLE.

SPECIFICATION forming part of Letters Patent No. 586,611, dated July 20, 1897.

Application filed June 25, 1896. Serial No. 596,833. (No model.)

*To all whom it may concern:*

Be it known that I, FRANCIS W. MALLETT, a citizen of the United States, residing in New York city, in the county and State of New York, have invented a certain new and useful Improvement in Bicycles, of which the following is a specification.

The best means for transmitting power from the crank-shaft to the rear or driving wheel is, perhaps, the most important mechanical problem offered in bicycle construction. While the sprocket-chain so generally employed has an advantage in its simplicity and directness, it is open to many objections. It is exposed to the dust, often fine sharp sand, which, mixing with the lubricant, produces an abrading paste entering each of the many joints, rapidly cutting away the chain and sprocket-wheels. Attempts have before been made to incase the chain and also to avoid its use by the substitution of beveled gearing and counter-shafts, also incased; but in all the forms known to me the result is a cumbersome, unbalanced, and unsightly addition to the wheel.

The object of my invention is to provide means for transmitting the power directly, while avoiding the use of chains or gearing, and also to inclose the mechanism almost entirely within the frame of the machine, thus effectually excluding the dust and still retaining the appearance of lightness, which is one of the chief beauties of the bicycle.

The invention consists of thrust-rods inclosed within the tubular members forming the lower rear fork, actuated longitudinally by spurs or projections on driving-wheels turning with the crank-shaft and giving corresponding successive impulses to the rear wheel of the bicycle. The power is communicated to the rear wheel by a clutch mechanism acting in the direction to drive the bicycle forward, returning idly, and the spur-wheels are so set on the crank-shaft that their teeth alternate, insuring that one thrust-rod and its connections are always engaged and in position for effective work. I supply means for preventing the spur-wheels turning in the wrong direction and also a simple and efficient brake mechanism. All the working parts not lying within the frame are inclosed in dust-proof casings.

The accompanying drawings form a part of this specification and represent what I consider the best means of carrying out the invention.

Figure 1 is a side elevation, on a small scale, showing a bicycle constructed in accordance with my invention. The remaining figures are on a larger scale. Fig. 2 is a vertical section, partly in elevation, showing the main working parts. Fig. 3 is a corresponding horizontal section and plan view. Fig. 4 is on a still larger scale. It corresponds to a portion of Fig. 2, but shows the parts more completely, and also differently conditioned. Fig. 5 is a horizontal section through the upper member of the bicycle-frame and a portion of the upper rear fork. Fig. 6 is a corresponding vertical section of a portion. Fig. 7 is a vertical section showing a detail on a much larger scale.

Similar letters of reference indicate the same parts in all the figures.

A is the bicycle-frame, certain portions being designated when necessary by supernumerals, as $A'$ $A^2$.

B and B' refer, respectively, to the rear and front wheels. $B^2$ is the saddle, $B^3$ the pedals, and $B^4$ the handle-bars, all of any well-known or approved construction, except as hereinafter stated.

C is the crank-shaft, turning in ball-bearings, as indicated at $b$.

$C'$ $C'$ are wheels or spider-frames carrying spurs $C^2$ on their peripheries, having rounded or semicircular ends matching closely to the correspondingly-shaped interior of the casing $A'$. Each spur-wheel $C'$ is grooved on its periphery between the spurs, so that the faces of the latter show and fill true circles formed half by the casing $A'$ and half by the groove. The back face of each tooth curves downward on a concave line to the periphery. The radial arms $C^3$ are set at one side of the center of the wheel to provide space within the casing $A'$ for an annular flange $C^4$, fixed on the arms about midway between the hub and periphery. Its outer face is turned true, and against it lies a brake-shoe $C^5$, connected by a loose link $C^6$ to a fixed pin $a$, set in the casing.

$a'$ is a fixed stop projecting inward from the latter, and $a^2$ is a thrusting-spring introduced between the end of the shoe and the stop tending to force the shoe backward. So long as the spur-wheel $C'$ turns in the direction indicated by the arrow to propel the bicycle forward the shoe is inoperative and rides idly on the flange $C^4$, but immediately resists any attempt to turn in the opposite direction by straightening the toggle formed by the link and shoe and tightly holds the wheel against the reverse motion.

D is one of a pair of transmitters or thrust-rods, one in each member $A^2$ of the nearly horizontal rear fork of the frame. The stiff central portion is smaller than the interior of the member and is guided therein by the bushings $a^3$ and the collar $d$. The ends $D'$ $D^2$ are flexible, being formed of steel wire closely coiled in a manner analogous to a helical spring, but with each convolution in contact with the next. This construction allows all the flexibility required with no compressibility longitudinally, qualities of vital importance to the successful operation of my invention. The end $D'$ is guided in the smoothly-curved extension $A^3$ of the casing $A'$ and also by a series of grooved rollers $a^4$, mounted on fixed studs supported in the casing. At the extremity is a hardened-steel button $D^3$, having a hemispherical face and a shank spirally grooved or screw-threaded to match to the coils of the wire and held therein against withdrawal by soldering or brazing. The function of the button is to contact with the spurs $C^2$ on the spur-wheel $C'$ as they are successively presented and transmit the power received to the thrust-rod of which it is a part.

$D^4$ is a spiral thrusting-spring lying between the bushing $a^3$ and collar $d$, exerting its force to impel the rod D toward the spur-wheel and force the button $D^3$ into the path of the succeeding tooth or spur after each impulse, and $D^5$ is a similar but lighter spring interposed between the collar $d$ and the bushing $a^5$ to cushion the rod on its release from a spur and prevent undue shock or noise. The opposite end $D^2$ of the rod is similarly formed and guided in the extension $A^5$ of the casing $A^4$ by the rollers $a^6$. The button $D^6$ at this end is knuckled to a pin $F^3$, projecting from a block $F^2$, forming part of the clutch mechanism inclosed in the casing $A^4$.

The construction and arrangement of the lower rear fork are important. Each member $A^2$ is smoothly finished on its interior and is joined to the extension $A^3$ by a socket on the latter large enough to receive the exterior of the tube $A^2$ and preserve a smooth unobstructed joint on the interior, so that the flexible portion $D'$ of the thrust-rod D may reciprocate across the junction freely and with little friction. The construction at the opposite end of the tube $A^2$ is correspondingly made to facilitate the traverse of the portion $D^2$ of the rod from the tube to the interior of the extension $A^5$.

E is the fixed rear axle of the bicycle. Its central portion is cylindrical, the ends $E'$ being flattened to engage correspondingly-shaped slots in the casing to prevent rotation and held in place by the nuts $E^3$ on the screw-threaded extensions $E^2$. The hub of the rear wheel B revolves on the cylindrical portion and consists of a tubular portion $E^4$, matching the axle, and two radial flanges $E^5$, to which are attached the wire spokes of the wheel in any ordinary or approved manner. The outer face of each flange carries an annular flange $E^6$, matching closely to the inclosing casing $A^4$ and forming an important part of the clutch mechanism.

$E^7$ are collars matching the axle and screwed into the outer faces of the flanges $E^5$ to form extensions of the tubular portion, and each carries in an enlargement $E^8$ the antifriction-balls $E^9$ for the bearings. Fitted upon the neck portions of each of the collars $E^7$ and held therein by the enlargement $E^8$ is a loose ring F, having a spring-arm $F'$, formed in one therewith or otherwise secured thereto, extending radially and terminating in the head or block $F^2$, before mentioned, curved on the outer face to match to the inner face of the annular flange $E^6$, lying closely thereto and knuckled, as above described, to the button $D^6$ to move with the rod D. A segmental clutch-block $F^5$ is connected to the ring F by a short angularly-arranged toggle-link $F^4$, adapted, when straightened, to force the clutch-block into strong frictional contact with the inner face of the flange $E^6$. It lies with its rear face adjacent to but slightly separated from the front face of the block $F^2$. A spring $F^6$, interposed between the link $F^4$ and a stop $F^8$, fixed on the casing-flange $F^7$, forming part of the block $F^2$, exerts a force tending to push the clutch-block rearward or toward the block $F^2$.

When the thrust is received from the rod D $D'$ $D^2$, the first effect is to push the block $F^2$ forward and slightly deflect the arm $F'$. The latter in yielding imparts its motion to the ring F, causing it to turn on the collar $E^7$ and straighten the toggle-link $F^4$. This engages the clutch-block strongly with the flange $E^6$ and turns it and the rear wheel B. The space between the block $F^2$ and the clutch-block is so slight that the former will contact with the latter before the strain on the spring-arm $F'$ is sufficient to endanger it, and all the parts of the clutch mechanism are so nicely fitted to each other that the lost motion is reduced to a minimum.

The yielding of the spring-arm $F'$ performs an important function in the operation of the clutch by preventing the clutch-block $F^5$ engaging the flange $E^6$ too strongly. If the arm were rigid, the full force of the thrust received from the rod D would be communicated to the toggle, and as the force varies with the power exerted by the rider there would be liability of the toggle under great pressure assuming a nearly straight position and refusing to again release. This is avoided by the elasticity of the spring-arm by transferring to the toggle only that amount of pressure necessary to effect the engagement of the clutch-block with the flange, and if there be a surplus to then bend the arm until its block $F^2$ advances to and against the adjacent face of the clutch-block. Any further pressure is then received directly upon the clutch-block in the direction to release. The result if the parts be properly proportioned is to cause the toggle to straighten to a certain angle and engage the flange $E^6$ with proportional force regardless of any excess of thrust, such excess instead of breaking or deranging the parts being expended in slipping the block $F^5$ on the flange.

As before stated, one of the clutches is always in engagement while the other is returning idly, and as the return movement is made in much less time than the thrust both clutches will be engaged at the same time during a portion of each stroke or reciprocation of the rod. Each complete revolution of the crank-shaft C produces seven impulses in the rod, which are transmitted to the clutch mechanism on each side, and the ratio between the spur-wheel and clutch as arranged as here shown will produce a little over two turns of the rear wheel for each revolution of the crank-shaft. This proportion may be varied in constructing the bicycle to produce any required ratio.

$A^6$ is a fixed stop secured to the casing $A^4$ and projecting into the path of the clutch-block $F^5$ a little in advance of its extreme throw, and G is a thin wedge pivoted to one end of a bell-crank lever G' with liberty to swing through a small arc. The other end of the bell-crank is knuckled to a rod $G^2$. There are preferably two sets of this mechanism, one for each clutch. Each rod $G^2$ is inclosed in a member of the upper rear fork and extends upward therein. These members are joined to each other by a semicircular curve partially encircling the seat-post set in a bracket $A^7$, and both join the upper straight member $A^8$ of the bicycle-frame.

The upper ends of the rods $G^2$ are made flexible in the same manner as for the ends of the rod D, and the flexible portions $G^3$ join a single stiff straight rod $G^4$, inclosed in the member $A^8$ and knuckled at the end to a lever $G^5$, fulcrumed at $g$ and working fore and aft in a slot $A^9$. The latter is notched at each end, as shown, to retain the lever at either end of its throw, while allowing it to be readily released and thrown over. This train of mechanism constitutes the brake. By turning the lever $G^5$ rearward each wedge G is projected outward into the space between the front face of the clutch-block and the stop $A^6$, preventing the clutch-block from traveling farther and partially releasing its hold on the flange $E^6$. Thus conditioned the force with which the clutch-block will engage the flange depends upon the force transmitted through the thrust-rods and increases with the pressure exerted by the feet on the pedals until the block $F^2$ is forced tightly against the rear face of the thrust-block. This is sufficient to quickly slow down the bicycle, but as the latter is going too fast the flange $E^6$ is moving in the same direction as the clutch-block ordinarily tries to send it, so the flange moves past the block in opposition to the friction of the latter, but in the direction to diminish such friction by the tendency to increase or widen the angle of the toggle and thus avoid instantaneous and dangerous stopping.

The operation of the driving mechanism is as follows: The pedals are placed in position as desired by the rider, and as they are not positively connected to the rear wheel they remain in that position while the rider mounts and places his feet upon the pedals. He then revolves the pedal-shaft as usual. Each spur $C^2$ on the wheels C' as it comes in contact with the button $D^3$ forces the rod D rearward and through the clutch mechanism revolves the rear wheel. As soon as the spur passes the button the rod returns and receives a fresh impulse from the next spur. As before stated, the spurs alternate on their wheels, so that one thust-rod is always engaged and is exerting its force to drive the bicycle forward. In coasting the feet are not removed from the pedals and the thrust-rods remain stationary, the bicycle traveling with no impediment other than the friction of the wheels on the ball-bearings. If the speed becomes too high, the rider checks it by applying the brake. The speed may then be regulated by pressure on the pedals in the direction to drive the bicycle faster.

The working faces of the teeth $C^2$ are curved, as shown in Fig. 2, to leave the buttons $D^3$ with a wiping motion to avoid danger of jamming the buttons between the faces of the spurs and the rollers $a^4$, and the rear faces are concaved to allow the immediate return of the rod D by the expansion of the spring $D^4$ after the passage of a spur. Reverse motion of the spur-wheel would crush the flexible end of the rod and is prevented by the shoe $C^5$ and its connections.

Each impulse given by a tooth or spur $C^2$ to the rod D is transmitted directly to the rear wheel, the only loss of power being that due to the friction in turning the slight curves.

All the parts are inclosed within the framing or in dust-proof casings. The weight of the driving mechanism is, I believe, less than that of the ordinary chain and its connections. The driving action is positive and is exerted on both sides, avoiding in great measure the torsional strains due to gearing on one side of the bicycle. Another advantage lies in the fact that the rider cannot lose his pedals. In coasting his feet may remain idly upon them, or in case he removes his feet the pedals do not partake of the rotation, but stand ready to be again engaged.

Modifications may be made in the forms and proportions and in the details of construction within wide limits.

Other forms of clutch mechanism may be substituted for that shown, and the brake mechanism may be omitted or other known or approved forms applied.

Although the invention has been described as applied to bicycles, it will be understood that it may serve in any analogous vehicles.

I claim—

1. In a bicycle, a spur driving-wheel, a flexible thrust-rod adapted to follow the curves in the inclosing frame members and casings, held yieldingly with one end in the path of the spurs and reciprocated by the passage of the latter, in combination with said frame members and casings and with a clutch engaging the rear wheel of the bicycle and operated by the reciprocations of said rod, all substantially as herein specified.

2. In a bicycle, a spur driving-wheel, a thrust-rod reciprocated by the passage of the spurs and having an inflexible middle portion and flexible ends adapted to follow the curves in the inclosing frame members and casings, in combination with the latter and with guide-rollers arranged at such curves on the opposite side of the rod to prevent buckling of said ends, and a clutch engaging the rear wheel of the bicycle and operated to drive the latter by the reciprocations of said rod, all arranged to serve substantially as herein specified.

3. In a bicycle, the thrust-rods D, D', D$^2$ inclosed within the members of the lower rear fork, the bushings $a^3$ and $a^5$ therein, the collars $d$ on said rods, the springs D$^4$ and cushion-springs D$^5$ arranged between said collars and bushings, the spur driving-wheel C' for reciprocating said rods, and the clutch mechanism engaging the rear wheel of the bicycle, all combined and arranged to serve substantially as herein specified.

4. In a bicycle, the thrust-rods having the inflexible middle portions D and flexible ends D', D$^2$ inclosed within the lower rear-fork members, the bushings $a^3$ therein and collars $d$ on the rods, the wheels C' and spurs C$^2$ thereon, the springs D$^4$ forcing one end of each rod into the path of the spurs, clutch mechanisms engaging the rear wheel of the bicycle, and the flanges C$^4$ on said spur-wheels and the brake-shoes C$^5$, fixed stops $a'$ and springs $a^2$ for engaging said flanges to prevent reversing the direction of motion of the spur-wheels, all combined and arranged to serve substantially as herein specified.

5. The clutch described consisting of a loose ring encircling the shaft on which the rear wheel turns, a spring-arm extending radially from the ring, a clutch-block, a link connecting the latter to the ring to form a toggle, and an annular flange on said rear wheel engaged by said clutch-block when the toggle straightens by pressure applied to said spring-arm, all combined and arranged to serve substantially as herein specified.

6. In a bicycle, the loose ring F encircling the shaft on which the rear wheel turns, a spring-arm F', F$^2$ extending radially therefrom, and connected to the reciprocating thrust-rod D, D', D$^2$, the clutch-block F$^5$, the link F$^4$ connecting the latter to the ring to form a toggle, an annular flange E$^6$ on the said rear wheel frictionally engaged by said clutch-block when the toggle straightens, the casing-flange F$^7$ and the spring F$^6$ interposed between the latter and the clutch-block, all combined and arranged to serve substantially as herein specified.

7. In a bicycle, the loose ring F encircling the shaft on which the rear wheel turns, a spring-arm F', F$^2$ extending radially therefrom and connected to the reciprocating thrust-rod D, D', D$^2$, the clutch-block F$^5$, the link F$^4$ connecting the latter to the ring to form a toggle, an annular flange E$^6$ on the said rear wheel engaged frictionally by said clutch-block when the toggle straightens, in combination with each other and a stop fixed to the casing in advance of the throw of the clutch-block, a lever and a wedge thereon adapted to be thrust between said stop and clutch-block, and means for operating the lever, all arranged to serve substantially as and for the purposes herein specified.

8. In a bicycle, the loose ring F encircling the shaft on which the rear wheel turns, a spring-arm F', F$^2$ extending radially therefrom and connected to the reciprocating thrust-rod D, D', D$^2$, the clutch-block F$^5$, the link F$^4$ connecting the latter to the ring to form a toggle, an annular flange E$^6$ on the said rear wheel engaged frictionally by said clutch-block when the toggle straightens, the stop A$^6$ fixed on the casing in advance of the throw of the clutch-block, the bell-crank lever G' and wedge G thereon, the rod G$^2$ inclosed within a member of the upper rear fork, the rod G$^4$ inclosed within the upper member of the frame, the flexible portion G$^3$ joining the said rods, and the operating-lever G$^5$ pivoted into said upper member, all combined and arranged to serve substantially as herein specified.

9. In a bicycle, the driving spur-wheels and flexible reciprocating thrust-rods, clutches operated by the latter and engaging the rear wheel of the bicycle, in combination with the casings A' and A$^4$ inclosing said spur-wheels and clutches, and the tubular lower fork members A$^2$ inclosing and guiding said rods, all substantially as herein specified.

10. In a bicycle, the driving spur-wheels, the flexible reciprocating thrust-rods, and clutches operated by the latter and engaging the rear wheel of the bicycle, in combination with the casings $A'$ and $A^4$ inclosing said spur-wheels and clutches, and the tubular lower fork members $A^2$ inclosing and guiding said rods, the upper rear-fork members and upper tube $A^8$, and the brake-operating rods inclosed and guided therein, all arranged to serve substantially as and for the purposes herein specified.

In testimony that I claim the invention above set forth I affix my signature in presence of two witnesses.

FRANCIS W. MALLETT.

Witnesses:
  N. M. FLANNERY,
  B. NUSBAUM.